Patented Aug. 24, 1937

2,091,123

UNITED STATES PATENT OFFICE 2,091,123

SPRAY RESIDUE REMOVAL

Harry C. McLean and Albert L. Weber, New Brunswick, N. J., assignors to Endowment Foundation, New Brunswick, N. J., a corporation of New Jersey No Drawing. Application April 1, 1935, Serial No. 14,130

18 Claims. (Cl. 99—103)

This invention relates to the washing of fruits and vegetables, such as apples, pears, string beans, peas, lettuce and the like to remove spray materials from the surface thereof and is an improvement upon the invention described and claimed in our co-pending application Serial No. 695,505, filed October 27, 1933, now Patent No. 2,003,005, issued May 28, 1935.

More particularly, the present invention is directed to the removal of arsenic or lead compounds which may be associated with mineral oils and which have been used in various combinations for spraying fruit trees to eradicate certain insect pests. The invention is also applicable to waxy fruit and the like in which the spray residues have become embedded in the wax, and which may not have been oil sprayed. Recently the Government has lowered the tolerance on the content of lead on fruit for edible purposes so that it has become increasingly essential that a washing operation be conducted to effectively remove these materials. Where a mineral oil has been used for spraying purposes, it may stimulate the formation of a resistant waxy covering on the fruit which prevents the ready access of the washing solution and thus tends to prevent effective cleaning of the fruit and removal of the lead and arsenic.

A number of methods for washing sprayed fruit have been developed and used. These have been only indifferently successful and have not always served to bring the arsenic and lead content down below the relatively small amount allowed by the Government. One of these processes consisted in providing a solution of hydrochloric acid with an emulsion of kerosene. The solution was heated to about 100° F. and the fruit washed therein. This process was unable to remove the arsenical residue sufficiently from fruit sprayed with mineral oil, fish oil or fish oil soaps, and lead arsenate to meet the export or the domestic market requirements.

Another previously proposed process consisted in first dipping the fruit in methyl alcohol solution to remove the coatings or oil or wax which form on the fruit, after which the fruit was subjected to a cleaning operation with hydrochloric acid solution. This process offered serious difficulties in that it was necessary to conduct two separate washing operations which greatly increased the cost of processing because of the need for maintaining additional washing equipment. The methyl alcohol may have detrimental effects on the health of the workers which is caused by prolonged exposure to the alcoholic vapors.

Still another process of the prior art resided in the use of such detergents as tri-sodium phosphate, sodium carbonate or sodium silicate in solution for washing fruit and the like. These substances do not remove the lead from the fruit to a satisfactory degree in all cases, and the solutions must be heated, say to 90°–100° F., in order to make them at all effective.

The present invention is directed to the washing of fruit with a solution which is comparatively inexpensive and which is capable of effectively removing the arsenical and lead residues from lead arsenate and oil sprayed fruit.

It is among the objects of our invention to provide a solution for washing fruit which is non-inflammable in nature, which in no way detrimentally affects the keeping qualities or appearance of the fruit, which has a sufficiently high solvent action so that without the necessity of applying heat it will remove the undesirable residues from the fruit, which will in no way endanger the health of the workers, and which is suitable for use with either the home-made flotation washers and dipping tanks, or for use with the various types of commercial washing machines in which a short period of contact between the fruit and the washing solution is maintained.

In practicing our invention as disclosed in the above-mentioned co-pending application, we provide a water solution of an acid, preferably a mineral acid, such as hydrochloric, nitric or the like, although for practical purposes hydrochloric acid has been found extremely well suited. The amount of hydrochloric acid in solution is generally not over three percent and usually is from 1 to 2 percent by weight. In some cases up to 5% of the HCl may be used. To this solution we add a degumming or wetting agent of a type which is made by the sulphonation of the higher aliphatic alcohols, higher fatty acids and the higher aliphatic and aromatic hydrocarbons, said compounds containing at least six carbon atoms. Usually the sulphonic compound, which is termed a sulphonic acid, is neutralized so as to form an alkali metal salt thereof. The preparation of such substances is well known and need not be here described.

While we are enabled to use substantially all of the degumming agents of the above described types, we have found that a sulphonated naphthalene compound such as the alkylated naphthalene sulphonic acids or their alkali metal salts are well adapted for our purpose. Among such compounds we have specifically tested the sodium salts of the butyl and propyl naphthalene sulphonic acids as well as the sodium salt of abietene sulphonic acid. We have found that in conjunction with the degumming agent, if there is present a substantial proportion of a water soluble salt such as sodium chloride or sodium sulphate, increased effectiveness in the resultant operation is obtained.

A solution of the above described type is very effective in the removal of the arsenical residue, but we have found that in washing apparatus having positive agitation, considerable foaming takes place which may result in over-flowing of the froth from the apparatus and thus result in the loss of washing solution. To overcome this, we generally add to the solution a substance which is adapted to prevent the foaming. While a considerable number of substances of various types may be used for this purpose, we find that substances taken from the following class, aliphatic ketones and alcohols having from 6 to 10 carbon atoms, pine oil, fusel oil, degras, naphtha or mixtures thereof, usually in comparatively small amounts, produce the desired antifoaming effects.

The washing solutions may vary greatly in the composition thereof. As indicated above, the amount of hydrochloric acid should ordinarily be not over three percent and is usually from 1 to 2 percent by weight. The amount of the degumming agent is usually not over 2 percent and ordinarily from ½ to 1 percent or even less, has been found suitable for the purpose. When a soluble salt is used in conjunction with the degumming agent, it is not necessary to use more than about 1 to 2 percent thereof. A considerably smaller proportion of antifoaming substance is required and ordinarily we use not over .5% thereof, and in most cases from .1 to .2 percent was sufficient to prevent foaming.

The washing operation with the use of a degumming or wetting agent in the solution is ordinarily conducted at normal atmospheric temperatures, say for example about 70° F. In most cases it is unnecessary to heat the solutions, which was considered essential in prior processes. The washing operation may be conducted for any desired length of time such as is usual in fruit washing. For instance, in the spray and flood type of washing machines the fruit may be held in contact with the acid solution for about ½ to 1 minute. In the commercial type of washer heating to 100° F. for a short time assists in the removal of spray residues in a shorter time but heating is not at all essential. With the homemade flotation type of washing machine the period of contact may be on the average about 3 minutes followed by thorough rinsing in water.

Repeated tests on fruit which had been subjected to the process of the above-mentioned application and which had been safely sprayed with lead arsenate and calcium caseinate or with lead arsenate and petroleum oil, have shown that the rated capacity of the washing machines is very materially increased by the use of a degumming or wetting agent as disclosed herein, due to the rapid and effective contact established between the hydrochloric acid and the lead arsenate. This is probably due to the rapid removal from the surface of the fruit of the oil or the outer film of the wax in which the spray residues are embedded, allowing the hydrochloric acid to make direct contact with the lead arsenate and dissolve the same. By the use of the above invention the washed fruit shows no deleterious effects after long storage and the surface of the fruit is bright and clear.

We have now discovered that the use of ammonium chloride as the soluble salt is particularly advantageous in solutions containing a sulphonated hydrocarbon and hydrochloric acid in place of the sodium chloride or sodium sulphate mentioned in our co-pending application. The better effect from the use of ammonium chloride is rather surprising inasmuch as this salt contains the same chlorine ion as does the sodium chloride heretofore found effective. Tests have indicated also that the remarkable effectiveness of ammonium chloride was not due particularly to the inclusion therein of the ammonium radical because nowhere near the same effectiveness was secured by the use of equal quantities of ammonium sulphate.

While the use of ammonium chloride in the above combination has been found to produce very desirable results over a wide range of percentages from 1 to 15%, yet the use of 10% thereof by weight has been found to give optimum results.

The effectiveness of ammonium chloride is shown clearly by the two tables below:

ROME BEAUTY APPLES

*Subjected to a washing solution in a flotation washer for three minutes at a temperature of 95° F.*

| | Lead residue per lb. of fruit |
|---|---|
| Untreated | .330 |
| 1.75% HCl | .070 |
| 1.75% HCl, 1% Sulphonated hydrocarbon | .033 |
| 1.75% HCl, 1% Sulphonated hydrocarbon, 10% $NH_4Cl$ | .020 |
| 1.75% HCl, 10% $NH_4Cl$ | .034 |
| 1.75% HCl, 1% Sulphonated hydrocarbon, 10% $(NH_4)_2SO_4$ | .087 |

BEN DAVIS APPLES

*Subjected to the washing solution in a bean brush washer for thirty seconds at a temperature of 95° F.*

| | Lead residue per lb. of fruit |
|---|---|
| Untreated | .406 |
| 1.9% HCl | .098 |
| 1.9% HCl, 1% Sulphonated hydrocarbon | .034 |
| 1.9% HCl, 1% Sulphonated hydrocarbon, 10% $NH_4Cl$ | .017 |
| 1.9% HCl, 10% $NH_4Cl$ | .075 |
| 1.9% HCl, 1% Sulphonated hydrocarbon, 10% NaCl | .064 |

The invention, therefore, contemplates the use of ammonium chloride in suitable proportions as an ingredient in any of the above combinations as a washing agent to remove spray residues Although we have described our invention setting forth the general nature thereof and indicating the various materials and proportions which have been found adapted for commercial practice, it is to be understood that our invention is not limited to the details described herein. It will be apparent to those skilled in the art that variations in the strength of solutions, in the time of contact of the fruit with the solutions, and the type and character of the apparatus used for washing, may be made at will with good results. The character and the amount of spray, as well as the length of storage of the fruit prior to the washing operation, may necessitate wide variations in the composition of the washing solutions and in the times of treatment. These and other changes are considered to be within the scope of this invention which is not to be limited except by the claims appended hereto.

What we claim is:

1. A method of washing fruit and the like to remove spray materials from the surface thereof which includes applying to the fruit a solution containing a small proportion of an acid, a sulphonated hydrocarbon and ammonium chloride.

2. A method of washing fruit and the like to remove spray materials from the surface thereof which includes applying to the fruit a solution containing a small proportion of hydrochloric acid, a sulphonated hydrocarbon and ammonium chloride.

3. A method of washing fruit and the like to remove spray materials from the surface thereof which includes applying to the fruit a solution containing a small proportion of hydrochloric acid, an alkali metal salt of a sulphonated hydrocarbon and ammonium chloride.

4. A method of washing fruit and the like to remove spray material from the surface thereof which includes applying to the fruit a solution containing a small proportion of hydrochloric acid, a sulphonated aromatic hydrocarbon and ammonium chloride.

5. A method of washing fruit and the like to remove spray material from the surface thereof which includes applying to the fruit a solution containing a small proportion of hydrochloric acid, a sulphonated naphthalene and ammonium chloride.

6. A method of washing fruit and the like to remove spray material from the surface thereof which includes applying to the fruit a solution containing a small proportion of hydrochloric acid, a sulphonated alkylated naphthalene and ammonium chloride.

7. A method of washing fruit and the like to remove spray materials from the surface thereof which includes applying to the fruit a solution containing not over 3% of hydrochloric acid by weight, a smaller amount of a sulphonated aromatic hydrocarbon and ammonium chloride.

8. A method of washing fruit and the like to remove spray materials from the surface thereof which includes applying to the fruit a solution containing not over 3% of hydrochloric acid by weight, not over 2% of a sulphonated aromatic hydrocarbon and ammonium chloride.

9. A method of washing fruit and the like to remove spray material from the surface thereof which includes applying to the fruit a solution containing about 1.0–2.0 percent of hydrochloric acid by weight, about 0.50–1.0 percent of a sulphonated alkylated naphthalene and ammonium chloride.

10. The method of claim 1 in which the amount of ammonium chloride present in the solution is about 10%.

11. The method of claim 2 in which the amount of ammonium chloride present in the solution is about 10%.

12. The method of claim 3 in which the amount of ammonium chloride present in the solution is about 10%.

13. The method of claim 4 in which the amount of ammonium chloride present in the solution is about 10%.

14. The method of claim 5 in which the amount of ammonium chloride present in the solution is about 10%.

15. The method of claim 6 in which the amount of ammonium chloride present in the solution is about 10%.

16. The method of claim 7 in which the amount of ammonium chloride present in the solution is about 10%.

17. The method of claim 8 in which the amount of ammonium chloride present in the solution is about 10%.

18. The method of claim 9 in which the amount of ammonium chloride present in the solution is about 10%.

HARRY C. McLEAN.
ALBERT L. WEBER.